Oct. 28, 1947.  H. E. TRENT  2,429,733
ELECTRIC HEATER OF THE FAN TYPE
Filed April 10, 1945  2 Sheets-Sheet 1
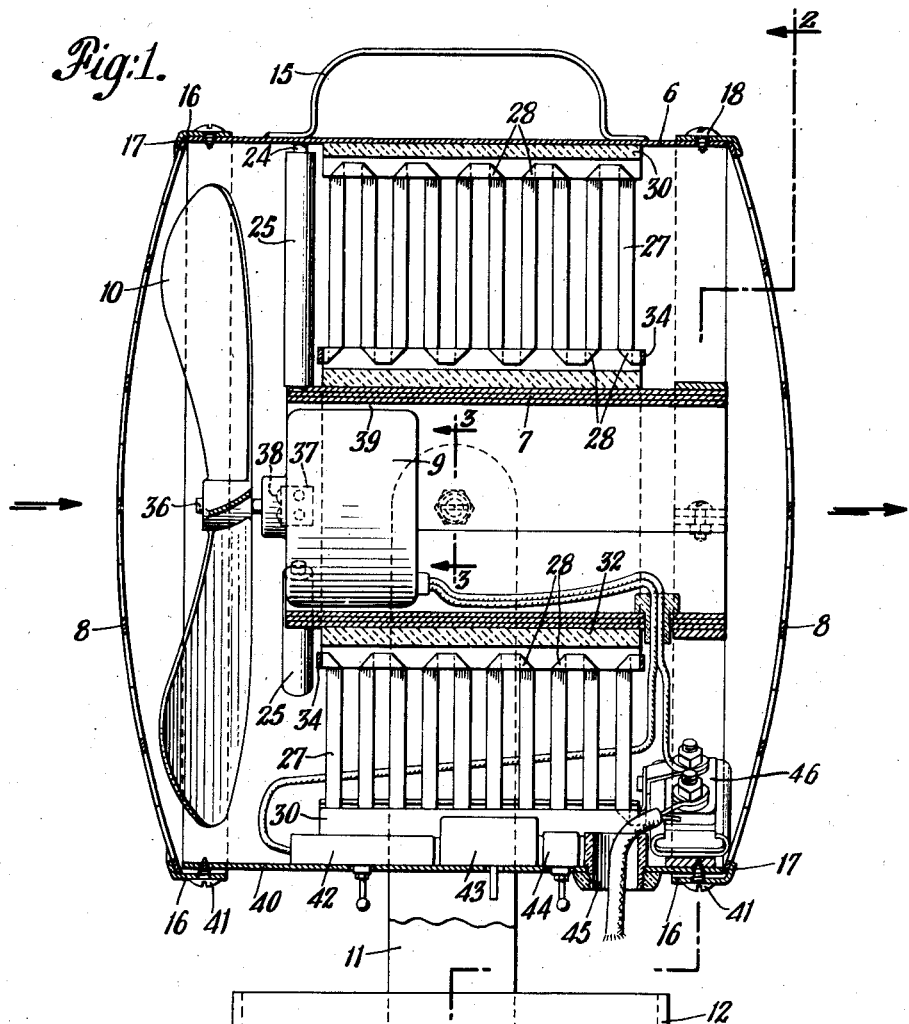
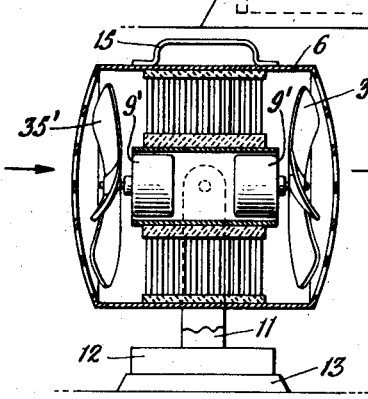
INVENTOR
Harold E. Trent
BY
ATTORNEYS Oct. 28, 1947.    H. E. TRENT    2,429,733
ELECTRIC HEATER OF THE FAN TYPE
Filed April 10, 1945    2 Sheets-Sheet 2

INVENTOR
Harold E. Trent
BY
ATTORNEYS

Patented Oct. 28, 1947

2,429,733

UNITED STATES PATENT OFFICE 2,429,733

ELECTRIC HEATER OF THE FAN TYPE

Harold E. Trent, Media, Pa., assignor to Trent, Inc., a corporation of Delaware

Application April 10, 1945, Serial No. 587,555

14 Claims. (Cl. 219—39)

My invention relates to a fan type electrical convection heater and has for its primary object the provision of a compact, highly efficient heater wherein the fan motor is effectively insulated from the heat and runs but little hotter than in the open air.

It is another object of my invention to provide a heater of the character described wherein, by the use of bare electrical resistor elements supported in the casing in a novel manner, there will be a minimum of interference with the flow of air through the heater and a maximum amount of heat imparted to the air.

It is a further object of my invention to provide a fan type convection heater which, by using a plurality of fan motors of the same size, may be manufactured in a wide range of wattage without any increase in diameter.

A further object of my invention is the provision of a heater which will respond quickly to the controls to supply hot air and will retain but a minimum of heat when turned off.

The foregoing, together with such other objects as may hereinafter appear, I obtain by means of a construction illustrated in the accompanying drawings wherein—

Figure 1 is a vertical section taken on the line 1—1 of Figure 2.

Figure 3 illustrates the detail of construction and is taken on the line 3—3 of Figure 1.

Figures 5, 6:
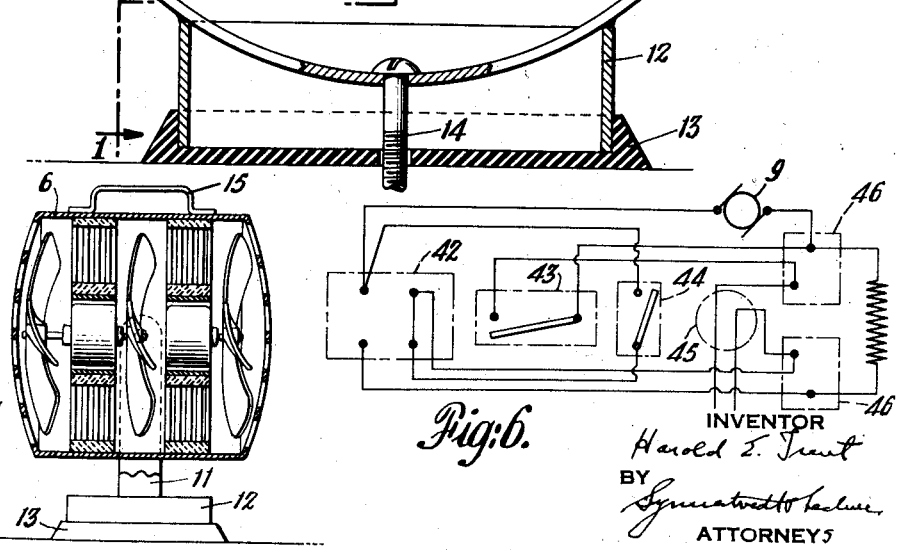

Figures 4 and 5 which are in view similar to Figure 1 diagrammatically illustrate modified forms of the invention.

Figure 2:
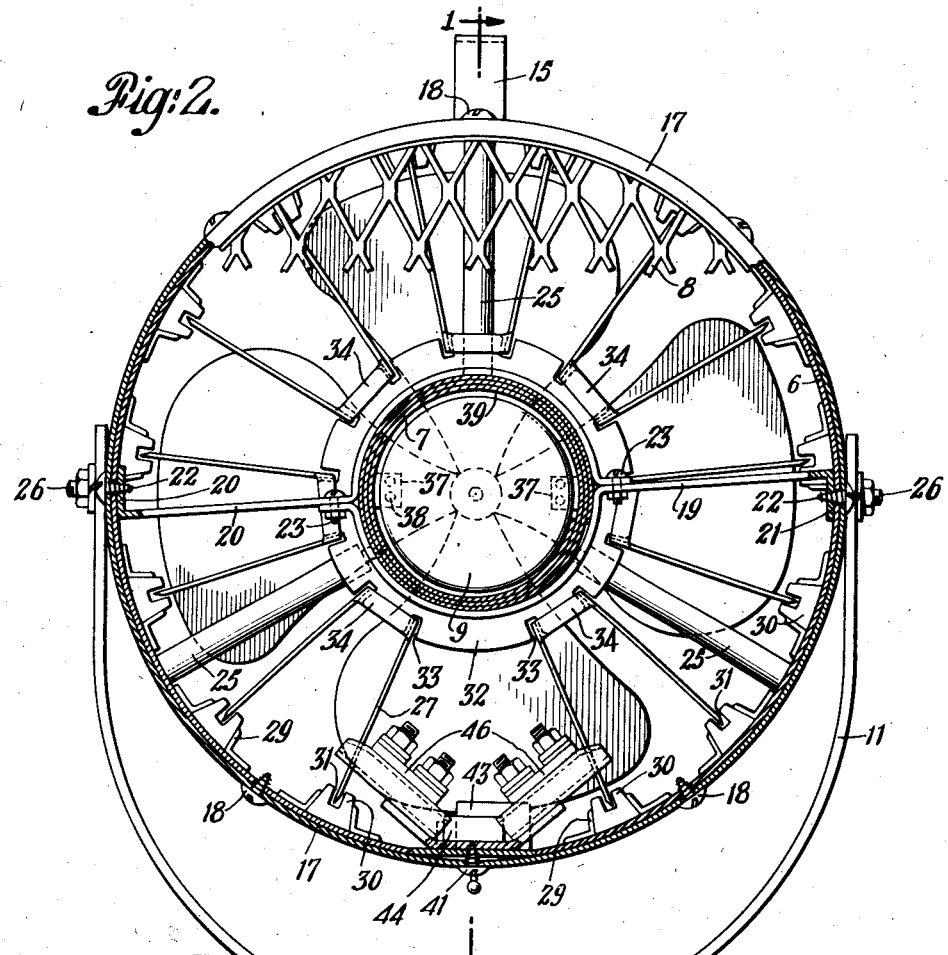
Figure 2 is a section taken on the line 2—2 of Figure 1.

Figure 6 is a wiring diagram of the heater illustrated in Figures 1 and 2.

The heater in general comprises a cylindrical casing 6, a cylindrical sleeve 7 concentrically mounted within the casing, the grills 8 at either end of the heater with a motor 9 mounted within the sleeve 7 which drives a fan 10 located at one end of the casing. The heater is supported by means of a U-shaped frame 11 welded to the base 12, which is set in a rubber cushion 13. The frame 11 is secured to a wall or floor in any desired position by means of a screw or bolt 14. It will be observed that the heater can be swung to any desired position by reason of the fact that the base 12 can be rotated about the screw 14 and the casing and the heater proper tilted on the U-shaped support. In other words, the heater has a universal mounting. The handle 15 mounted on the top of the casing provides a convenient means for carrying the heater.

Coming now to the more detailed description, the casing 6 is preferably made of sheet metal. At each end of the casing the grills 8 are held in place by means of a band 16 having a small inturned lip 17 which engages the edge portion of the grill throughout the periphery of the heater. These bands are secured to the casing 6 by means of the screws 18. I have found that in order to minimize interference with the air flow and also to reduce noise it is desirable that these lips be only sufficiently large to hold the grill securely in place.

The cylindrical sleeve 7 is substantially concentrically mounted within the casing 6 by means of the sheet metal straps 19 and 20 and rods 24. At their outer ends the straps 19 and 20 have a bent-over portion 21 which is secured to the casing 6 by means of the screws 22. The inner end of each strap is semi-circular and together the ends of the two straps encircle the sleeve 11. The two straps are bolted together near the sleeve 7 by means of bolts 23 and the sleeve is thus firmly held in position at one end. The other end of the sleeve is supported by three radially-extending rods 24, the inner ends of which are welded to the outside of the sleeve 7 and the outer ends welded to the inside of the casing 6. These rods 24 are surrounded by porcelain tubes 25 which are slid onto the rods before they are welded into position. The casing 6, as a whole, is supported from the U-shaped strap member 11 by means of bolts 26, the heads of which are countersunk into the inside of the casing, as indicated in Figure 3. The casing can be tilted on these bolts 26 to any desired position as was pointed out above.

The heating element or resistor 27 as illustrated is in the form of a continuous ribbon which may be flat or slightly arcuate in cross-section. The resistor is folded at regularly spaced intervals as indicated at 28 so that it extends radially back and forth between the casing and the sleeve. It will be observed that the resistor as a whole consists of a number of "runs" or sections extending from end to end of the sleeve 7 and lying in planes which extend radially from the sleeve. These planar sections or runs are connected one with another by means of bridges 34 which are part of the ribbon which forms the resistor, the bridge being formed by folding the resistor.

The resistor is supported in position by means of a porcelain refractory element 32 surrounding the sleeve and other refractory elements 30 mounted on the inner side of the casing. The porcelain insulators 30 on the casing are supported by angular retaining clips 29 which are welded to and extend lengthwise of the casing. The clips are arranged in pairs to provide a channel wider at the bottom than at the top and the insulators 30, which are also wider at the bottom than at the top, fit snugly into the channel formed by the clips 29 and are thus held firmly in position. Each of the insulators 30 is provided with a slot 31 running lengthwise from end to end of the insulator.

The insulating member which supports the inner end of the runs of the resistor consists of a cylindrical porcelain member 32 which surrounds the sleeve 7. This insulator 32 has a number of slots 33 running parallel to the slots 31 in the insulators 30 and extending from end to end of the insulator 32 at spaced intervals about the periphery thereof. It will be observed that the folded portions 28 of the resistor 27 are inserted in the slotted portions 31 and 33 and the resistor as a whole is held against longitudinal movement in the slots by means of the bridges 34 which engage the ends of the cylindrical insulator 32. The resistor ribbon should be made of material which is sufficiently stiff to prevent sagging and I have found in practice that the arrangement just described provides a simple and effective manner of supporting the bare resistor between the casing and the sleeve.

It should be noted that in assembling the heater the resistor should first be placed in position on the cylindrical insulator 32. The cylindrical insulator 32 is then slid over the sleeve 11 and the outer end of each run of the resistor slid into the slots 31 of the insulators on the inside of the casing. After being thus assembled, the straps 19 and 20 can be placed in position to support the end of the sleeve 7.

I do not confine myself to the particular arrangement of resistor and insulators illustrated. The resistor, for example, need not be made of a continuous ribbon but could be made in sections which have appropriate electrical connections and for use with a three phase current could likewise be made in separate sections with appropriate connections. If desired it is also possible to arrange the insulators 30 and slots in the insulator 32 helically so that the resistor instead of lying in radially extending planes will lie in a helical path.

Air is circulated through the casing by means of the fan 10 carried on the shaft 36 which is driven by the motor 9. This motor is mounted in the sleeve 7 by means of two angular clips 37 which are secured to the inner surface of the sleeve by welding or bolting and to the casing of the motor by bolts 38. The motor is somewhat smaller than the sleeve in order to provide an annular passage 39 around the motor through which air will be driven by the fan in order to aid in keeping the motor cool.

Further in order to prevent overheating of the motor, the sleeve 7, instead of being of a single thickness of metal, may be laminated. In the form illustrated the lamination is secured by rolling a single piece of sheet metal into a sleeve of the desired dimension, but the lamination could be secured by using three separate tubes fitting together. It will also improve the insulating qualities of the sleeve if polished stainless steel is used for the laminae. The motor is further insulated from the heat of the resistors by the refractory insulator 32. I have found in actual practice that by reason of the insulation afforded by the sleeve 7 and insulator 32 and the cooling effect of the air flowing over the motor in the space 39 the motor runs but little hotter than in the open air and danger of overheating is eliminated.

The operation of the heater is controlled by switches and a thermostat which are mounted on a panel 40 set in an opening in the lower part of the casing 6. This panel is supported in position by the bands 16 to which it is secured by means of the screws 41 and provides a simple and convenient arrangement for mounting the electrical control elements. This panel carries a switch 42 for controlling operation of both the resistor and the fan, a thermostat 43, a switch 44 for the motor only, an inlet 45 for the cable for supplying the electric current to the heater and terminal blocks 46 mounted at the end so as to be accessible from outside the heating unit. The two switches have appropriate toggles projecting downward through the panel and there is also a reset lever for the thermostat so that it can manually be reset in case the thermostat has opened the circuit.

It will be observed that the panel 40 and the parts which are supported on it—switch 42, thermostat 43, switch 44, inlet 45 and terminal blocks 46—form a complete unit which can be readily removed from the heater for repair or adjustment and equally readily reinserted. This eliminates the difficulty encountered in former heaters where the various parts were mounted separately at different places in the heater and, in many cases, in relatively inaccessible locations.

The wiring diagram in Figure 6 illustrates the various electrical connections and circuits and needs no further explanation.

The construction illustrated in Figures 1 and 2 is satisfactory with a given size motor. For example, in a five-kilowatt heater, i. e., the limitation in kilowatts represents the amount of energy which can be drawn off from the heater with one fan of a motor of a particular size. It has been a practice in the art when larger-sized heaters were wanted to increase the diameter and use a larger motor and a larger fan. I have found, however, that a heater of greater capacity can be secured much more economically by increasing the length of the heater and using an additional fan and motor of the same size as would be used in the smaller heater. I have diagrammatically illustrated such an arrangement in Figure 4. The heater there shown, although of greater capacity than the heater shown in Figures 1 and 2, would be of the same diameter and the mounting details would be the same. The difference lies in the fact that the heater is longer in proportion to the diameter of the heater shown in Figures 1 and 2 and an additional fan having a motor mounted in the end of the sleeve 7' is provided. The fans 35' are so mounted that one is pulling the air into the heater and the other discharging it. It is obvious that the limitation of the amount of work that a particular fan and motor could do depends on the length and density of the obstruction behind the fan and in the case of the heater the obstruction is the heating unit. The lengthening of the heating unit, of course, increases the obstruction but I have found that the addition of the second fan and motor in effect neutralizes the effect of the additional obstruction and in actual practice I have secured excellent results with the double fan arrangement illustrated in Figure 4. In case still further increase in capacity is required, I have diagrammatically illustrated in Figure 5 an arrangement in which three fans are used and there would, of course, be an increase in the proportionate length of the heating element of the casing and resistor. The construction just described permits of standardization on many parts of the heater; for example, the diameter of the sleeve casing, the insulator surrounding the sleeve, fans and motors, grill bands, mounting details, etc., and results in an economy of construction which cannot be secured in the present practice of increasing the diameter of the heater and size of the motor for an increase in capacity.

I claim:

1. An electrical heater comprising an outer casing, an inner substantially concentrically disposed sleeve, insulators on the inside of said casing and on the outside of said sleeve, bare electrical resistor elements supported by and extending radially back and forth between the insulators on the sleeve and those on the casing, said resistor elements being sufficiently stiff to prevent sagging, a fan for circulating air through the casing over said resistor elements and a motor for said fan mounted within said sleeve.

2. An electrical heater comprising an outer casing, an inner substantially concentrically disposed heat insulated sleeve, insulators on the inside of said casing and on the outside of said sleeve, bare electrical resistor elements supported by and extending radially back and forth between the insulators on the sleeve and those on the casing, said resistor elements being sufficiently stiff to prevent sagging, a fan for circulating air through the casing over said resistor elements and a motor for said fan mounted within said sleeve.

3. An electrical heater comprising an outer casing, an inner substantially concentrically disposed sleeve, insulators on the inside of said casing and on the outside of said sleeve, a continuous bare electrical resistor element supported by and extending radially back and forth between the insulators on the sleeve and those on the casing, said resistor elements being sufficiently stiff to prevent sagging, a fan for circulating air through the casing over said resistor elements and a motor for said fan mounted within said sleeve.

4. An electrical heater comprising an outer casing, an inner substantially concentrically disposed sleeve, insulators on the inside of said casing and on the outside of said sleeve, a bare electrical resistor element supported by and extending between the insulators on the sleeve and those on the casing, said resistor being in the form of a ribbon folded at spaced intervals, the folded portions thereof being carried by the insulators, a fan for circulating air through the casing over said resistor elements and a motor for said fan mounted within said sleeve.

5. An electrical heater comprising an outer substantially cylindrical casing, an inner substantially concentrically disposed sleeve, a plurality of slotted insulating members disposed about the inner surface of said casing with the slots thereof extending longitudinally of the casing, slotted insulating means on said sleeve with the slots extending longitudinally thereof, a continuous folded ribbon-like bare resistor extending between insulators on the casing and the sleeve, with the folds thereof in said slots and means for passing a current of air through said casing.

6. An electrical heater comprising an outer substantially cylindrical casing, an inner substantially concentrically disposed sleeve, a plurality of slotted insulating members disposed about the inner surface of said casing with the slots thereof extending longitudinally of the casing, a substantially cylindrical casing surrounding said sleeve and having slots therein extending longitudinally of the sleeve, a continuous folded ribbon-like bare resistor extending between insulators on the casing and the sleeve with the folds thereof in said slots, a fan for circulating air through the casing and a motor for the fan mounted within the sleeve.

7. An electrical heater comprising an outer casing, an inner substantially concentrically disposed sleeve, insulators on the inside of said casing and on the outside of said sleeve, bare electrical resistor elements supported by and extending between the insulators on the sleeve and those on the casing, a fan for circulating air through the casing over said resistor elements, a motor for said fan mounted within said sleeve and a removable panel set in said casing, said panel carrying a thermostat and switches for controlling operation of the motor and temperature of the resistor.

8. An electrical heater comprising an outer casing having an opening therein, an inner substantially concentrically disposed sleeve, insulators on the inside of said casing and on the outside of said sleeve, bare electrical resistor elements supported by and extending between the insulators on the sleeve and those on the casing, a fan for circulating air through the casing over said resistor elements, a motor for said fan mounted within said sleeve and a removable panel set in the opening in the casing, said panel carrying switch means and a thermostat for controlling operation of the motor and temperature of the resistor.

9. An electrical heater comprising an outer casing, an inner substantially concentrically disposed sleeve, insulators on the inside of said casing and on the outside of said sleeve, bare electrical resistor elements supported by and extending between the insulators on the sleeve and those on the casing, a fan for circulating air through the casing having a motor mounted in one end of said sleeve and another fan having its motor mounted in the other end of said sleeve.

10. An electrical heater comprising an outer casing, a plurality of inner substantially concentrically disposed sleeves supported from said casing, insulators on the inside of said casing and on the outside of said sleeves, bare electrical resistor elements supported by and extending between the insulators on the sleeve and those on the casing and a plurality of fans for circulating air through the casing, each having a motor mounted in one of said sleeves.

11. An electrical heater comprising an outer casing, an inner substantially concentrically disposed sleeve, bare electric resistor elements extending radially back and forth between the casing and the sleeve, means supporting the resistor out of contact with the casing and the sleeve, the space between the casing and sleeve being substantially unobstructed by said resistor supporting means, a fan for circulating air through the casing over said resistor elements, and a motor for the fan mounted within said sleeve.

12. An electrical heater comprising an outer casing, an inner substantially concentrically disposed sleeve, bare electric resistor elements extending radially back and forth between the casing and the sleeve, insulating means on said sleeve supporting said resistor, and insulating said sleeve from the heat thereof, a fan for circulating air through the casing over said resistor and a motor for said fan mounted within the sleeve.

13. An electric heater comprising an outer casing, an inner substantially concentrically disposed sleeve, bare electrical resistor elements supported between the casing and the sleeve, a fan for circulating air over said resistor elements and a motor for said fan mounted in one end of said sleeve, the relation of the diameter of the sleeve and heating capacity of the resistor being such that the sleeve would not accommodate a single motor of proper size to drive a fan to supply the desired amount of air, and another fan having a motor of substantially the same size as the first motor, said latter motor being mounted in the other end of said sleeve, the combined effect of said two fans and motors being sufficient to move the desired quantity of air through the heater.

14. An electrical heater comprising an outer substantially cylindrical casing, an inner substantially concentrically disposed sleeve, a plurality of slotted insulating members disposed about the inner surface of said casing with the slots thereof extending longitudinally of the casing, slotted insulating means on said sleeve with the slots extending longitudinally thereof, a continuous ribbon-like bare resistor extending between insulators on the casing and the sleeve and supported in the slots thereof, and means for passing a current of air through the heater.

HAROLD E. TRENT.

REFERENCES CITED

The following references are of record in the file of this patent:

UNITED STATES PATENTS

| Number | Name | Date |
|---|---|---|
| 1,926,537 | Hoffman | Sept. 12, 1933 |
| 1,866,840 | Carmean | July 12, 1932 |
| 2,120,795 | Boothby | June 14, 1938 |
| 1,620,767 | Johnson | Mar. 15, 1927 |
| 1,928,142 | Trent et al. | Sept. 26, 1933 |